(12) United States Patent
Abel et al.

(10) Patent No.: US 8,019,781 B2
(45) Date of Patent: Sep. 13, 2011

(54) HOST CONTEXT FRAMEWORK

(75) Inventors: Todd J. Abel, Redmond, WA (US);
Satish R. Thatte, Redmond, WA (US);
Ricard Roma Dalfo, Redmond, WA
(US); Alex Burst, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 384 days.

(21) Appl. No.: 11/706,530

(22) Filed: Feb. 15, 2007

(65) Prior Publication Data

US 2008/0201354 A1    Aug. 21, 2008

(51) Int. Cl.
*G06F 7/00* (2006.01)
*G06F 17/30* (2006.01)

(52) U.S. Cl. ........................ 707/791; 707/802

(58) Field of Classification Search .................. 707/102
See application file for complete search history.

(56) References Cited

U.S. PATENT DOCUMENTS

| | | | |
|---|---|---|---|
| 5,960,200 A | 9/1999 | Eager et al. | |
| 6,167,564 A | 12/2000 | Fontana et al. | |
| 6,345,387 B1* | 2/2002 | Morrison | 717/170 |
| 6,349,404 B1 | 2/2002 | Moore et al. | |
| 6,389,588 B1 | 5/2002 | Wadhwa et al. | |
| 6,502,102 B1* | 12/2002 | Haswell et al. | 707/102 |
| 6,571,247 B1* | 5/2003 | Danno et al. | 707/100 |
| 6,601,233 B1 | 7/2003 | Underwood | |
| 6,847,981 B2 | 1/2005 | Song et al. | |
| 6,988,128 B1* | 1/2006 | Alexander et al. | 709/206 |
| 7,188,163 B2* | 3/2007 | Srinivasan et al. | 709/221 |
| 7,203,938 B2* | 4/2007 | Ambrose et al. | 717/170 |
| 7,383,355 B1* | 6/2008 | Berkman et al. | 709/246 |
| 7,478,388 B1* | 1/2009 | Chen et al. | 718/1 |
| 2003/0041076 A1* | 2/2003 | Lucovsky et al. | 707/500 |
| 2003/0229884 A1* | 12/2003 | Carr et al. | 717/101 |
| 2003/0233631 A1 | 12/2003 | Curry et al. | |
| 2004/0148420 A1* | 7/2004 | Hinshaw et al. | 709/231 |
| 2005/0144226 A1 | 6/2005 | Purewal | |
| 2006/0112122 A1 | 5/2006 | Goldszmidt et al. | |
| 2006/0195816 A1 | 8/2006 | Grandcolas et al. | |
| 2006/0212846 A1* | 9/2006 | O'Farrell et al. | 717/116 |
| 2006/0230382 A1 | 10/2006 | Moulckers | |
| 2007/0299872 A1* | 12/2007 | Bier | 707/104.1 |
| 2008/0222618 A1* | 9/2008 | Valtchev | 717/139 |
| 2009/0007098 A1* | 1/2009 | Chevrette et al. | 717/177 |

OTHER PUBLICATIONS

"Making Software Reuse Work: An Implementation Model", Date: 1991, pp. 61-68, vol. 16, Issue: 3, http://delivery.acm.org/10.1145/130000/127107/p61-prieto-diaz.pdf?key1=127107 &key2=5545321611&coll=GUIDE&dl=GUIDE, ACM &CFID=11111111&CFTOKEN=2222222.

Pensivy, et al., "PalaTINAt: A TINA Based Control Platform for Telecommunication and Information Services", http://ieeexplore.ieee.org/iel4/5346/14461/00660716.pdf?tp=&arnumber=660716 &isnumber=14461.

Poulin, et al., "The business case for software reuse", Date: 1993, vol. 32, No: 4, http://www.research.ibm.corin/journal/sj/324/poulin.pdf.

* cited by examiner

*Primary Examiner* — Kuen S Lu
*Assistant Examiner* — Tuan Pham

(57) ABSTRACT

Techniques for host context framework are described. An apparatus may comprise a client device having a host application program with multiple host item objects, and a host context manager to manage multiple host contexts corresponding to the host item objects. The host context manager may create a host context for each host item object, and perform operations for each host item object in accordance with the corresponding host context. Other embodiments are described and claimed.

10 Claims, 5 Drawing Sheets

HOST CONTEXT FRAMEWORK

BACKGROUND

Application software is a subclass of computer software that employs the capabilities of a computer directly to a task that the user wishes to perform. This may be contrasted with system software which is involved in integrating various capabilities for a computer, but typically does not directly apply them in the performance of tasks that benefit the user. Creating a new application program or programming against an existing application program may be difficult, however, since it requires intimate knowledge of various application program interfaces, internal data structures and data schemas, and how an application program actually works. Consequently, programming solutions are typically complex, proprietary and expensive to develop. Accordingly, there may be a need for improved techniques to solve these and other problems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments may be generally directed to a host context framework. Some embodiments may be particularly directed to a host context framework for managing host contexts for various item objects. Each host context may comprise a set of behavior operations and behavior descriptions for a corresponding item object. By uniformly defining a set of behavior operations and behavior descriptions for respective item objects, and associated program interfaces, programming for the item objects may become less complex. Changes in the treatment of item objects may be accomplished by modifying the behavior operations and behavior descriptions for a respective item object, rather than having to modify customized programming code for the respective item object, or the application program implementing the item object.

In one embodiment, for example, an apparatus such as a client device may have a host application program with multiple host item objects, and a host context manager to manage multiple host contexts corresponding to the host item objects. The host context manager may be arranged to create a host context for each host item object, and perform operations for each host item object in accordance with the corresponding host context. Other embodiments are described and claimed.

DETAILED DESCRIPTION

Various embodiments may be directed to a host context framework for implementing new application programs and new solutions for existing application programs. The host context framework may solve many of the problems associated with highly customized programming code typically implemented for application programs. Creating a new application program or programming against an existing application program may be difficult since it requires intimate knowledge of various application program interfaces, internal data structures and data schemas, and how an application program actually works. Consequently, programming solutions are typically complex, proprietary and expensive to develop.

Various embodiments attempt to solve these and other problems by uncoupling specific program solutions from the underlying application programs. Various embodiments attempt to expose the functionality of an application program in a uniform manner that allows a solution designer to focus on a set of design goals for a given solution rather than how the design goals will be actually implemented. Various embodiments attempt to provide re-useable programming parts that can be arranged in unique configurations to create new program solutions. The programming parts may allow extensibility of certain item objects without necessarily having intimate knowledge of their internal methods, structures or interfaces. For example, a catalog may be used to encompass all the elements of a given solution for an item object. Changes for an item object may be implemented by modifying the elements stored by the catalog. Consequently, the host context framework is driven by descriptions rather than code. Accordingly, the complexity and cost for creating and implementing new solutions may be reduced. Further, solutions implemented using the host context framework may be compatible thereby facility interoperability between the various solutions.

Figure 1:
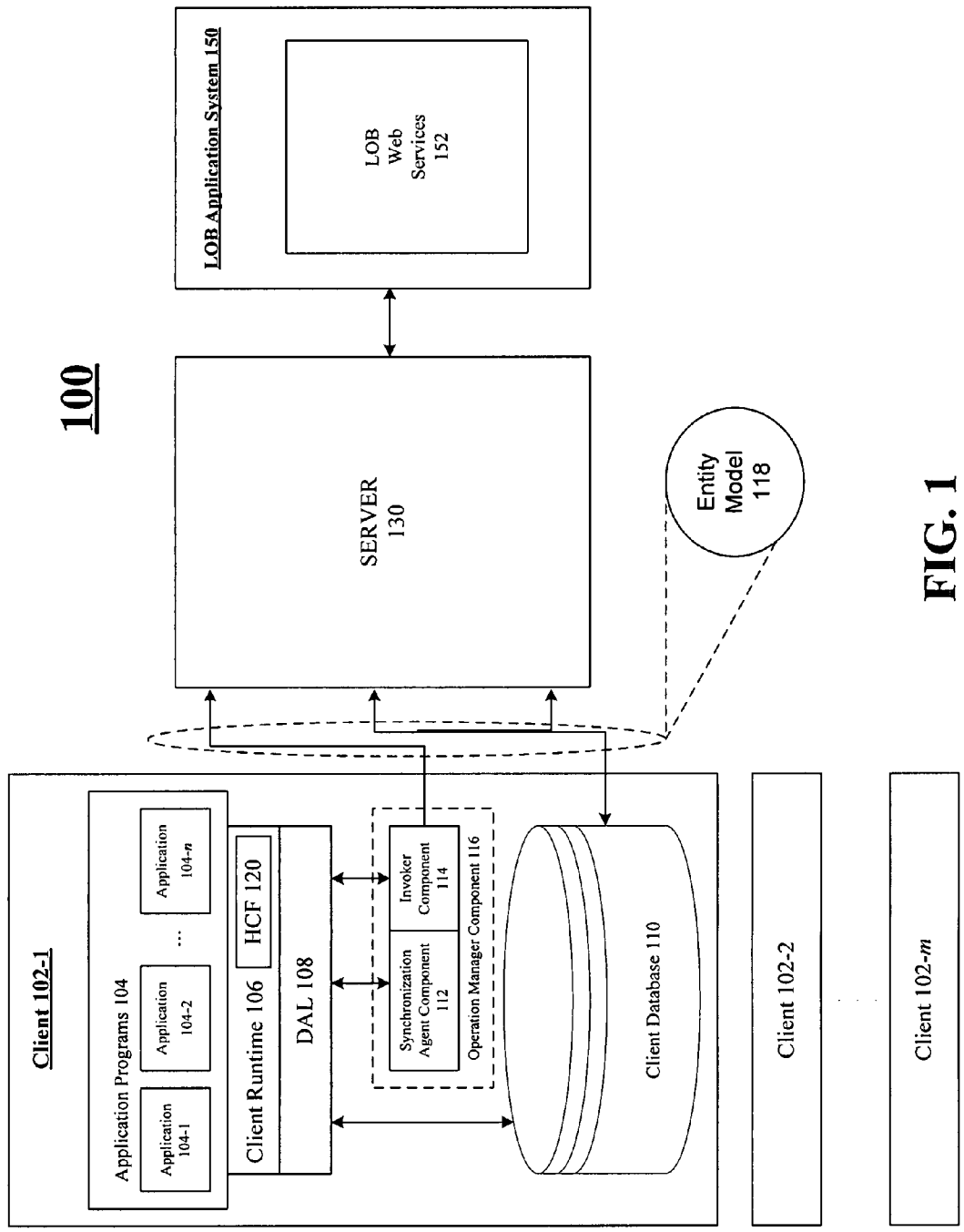
FIG. 1 illustrates one embodiment of an enterprise system.

FIG. 1 illustrates one embodiment of an enterprise system 100. The enterprise system 100 may be suitable for implementing a line of business (LOB) system. By way of example and not limitation, some embodiments may describe the host context framework in the context of an LOB system and associated applications. The host context framework, however, is not limited to such examples.

As shown in FIG. 1, the enterprise system 100 includes one or more clients 102-1-m, a server 130 and a LOB application system 150. It may be appreciated that the enterprise system 100 may comprise more or less elements as desired for a given implementation. It may also be appreciated that FIG. 1 also illustrates a subset of elements typically implemented for a computing device or system, and a more detailed computing system architecture suitable for implementing the clients 102-1-m, the server 130, and/or the LOB application system 150 may be described with reference to FIG. 5. The embodiments are not limited in this context.

As used herein the terms "component" and "system" are intended to refer to a computer-related entity, either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

In various embodiments, the enterprise system 100 may include the LOB application system 150. A LOB system generally includes various LOB application programs typically implemented on enterprise hardware platforms for a business entity. LOB application programs are application programs designed to provide various business application services. Examples of LOB application programs may include a Customer Relationship Management (CRM) application program, an Enterprise Resource Planning (ERP) application program, a Supply Chain Management (SCM) application program, and other business application programs using business-oriented application logic. In one embodiment, for example, the LOB application programs may be implemented in the form of various web services, as represented by Enterprise Web Services (EWS) 142.

In various embodiments, the LOB application system 150 may comprise an enterprise hardware platform for a business entity suitable for storing and executing the EWS 142 to create, read, update, delete, query or otherwise process LOB data stored in an LOB system database. In addition to storing the LOB data in the LOB application system 150, the LOB data for the various LOB application programs may be stored in various elements throughout a LOB system, including a middle-tier LOB server 130 and multiple LOB client devices 102-1-$m$, for example. The LOB application system 150 may be implemented on any hardware and/or software platform as described for the clients 102-1-$m$ and the server 130, as well as others. The embodiments are not limited in this context.

In various embodiments, the enterprise system 100 may include one or more servers 130. The server 130 may be communicatively coupled to the LOB system 140. The server 130 may any comprise any server device or server system arranged to use or process LOB data for one or more of the EWS 142 of the LOB application system 150. Examples for the server 130 may include but are not limited to a processing system, computer, server, work station, personal computer, desktop computer, and so forth. The embodiments are not limited in this context. In one embodiment, for example, the server 130 may be implemented as a middle-tier LOB server.

In various embodiments, the enterprise system 100 may include one or more clients 102-1-$m$. The clients 102-1-$m$ may comprise any client device or client system arranged to use or process LOB data for one or more EWS 142 of the LOB application system 150. Examples for client 102-1-$m$ may include but are not limited to a processing system, computer, server, work station, appliance, terminal, personal computer, laptop, ultra-laptop, handheld computer, personal digital assistant, consumer electronics, television, digital television, set top box, telephone, mobile telephone, cellular telephone, handset, wireless access point, base station, subscriber station, mobile subscriber center, radio network controller, router, hub, gateway, bridge, switch, machine, or combination thereof. In one embodiment, for example, a client 102-1-$m$ may be implemented as an LOB client device, application or system. A more detailed block diagram for the clients 102-1-$m$ may be provided with the client 102-1. It may be appreciated that the various elements provided with the client 102-1 may apply to any of the other clients 102-2-$m$ as desired for a given implementation.

In various embodiments, the client 102-1 may include one or more host application programs 104-1-$n$. A host application program may comprise any application program that employs the capabilities of a computer directly to a task that the user wishes to perform. This may be contrasted with system software which is involved in integrating various capabilities for a computer, but typically does not directly apply them in the performance of tasks that benefit the user. In this context the term application refers to both the application software and its implementation. Examples of the host application programs 104-1-$n$ may include but are not limited to productivity application programs that are part of a MICROSOFT® OFFICE suite of application programs, such as a MICROSOFT WORD application program, a MICROSOFT EXCEL application program, a MICROSOFT POWERPOINT application program, a MICROSOFT ACCESS application program, a MICROSOFT VISIO application program, a MICROSOFT OUTLOOK application program, and so forth. For example, an application program 104-1 may comprise the MICROSOFT OUTLOOK application program. The MICROSOFT OUTLOOK application program 104-1 is a personal information manager. Although often used mainly as an electronic mail (email) application, it also provides other application services such as calendar, task and contact management, note taking, and a journal. Application programs 104-1-$n$ can be used as stand-alone applications, but can also operate in conjunction with a MICROSOFT EXCHANGE server to provide enhanced functions for multiple users in an organization, such as shared mailboxes and calendars, public folders and meeting time allocation. Client data for the MICROSOFT OUTLOOK application program may be stored in an OUTLOOK client database or data store (not shown).

Various embodiments may be described with reference to MICROSOFT OFFICE application program by way of example. In the context of a host application program from the MICROSOFT OFFICE suite of application programs, the application program may also be referred to herein as an Office Business Application (OBA). An OBA may comprise a generic term for applications built on a LOBi application framework. Although some embodiments may be described with reference to MICROSOFT OFFICE application programs by way of example, it may be appreciated that the techniques described herein apply to any host application programs as desired for a given implementation. The embodiments are not limited in this context.

In various embodiments, the client 102-1 may include a client runtime (CRT) 106. Client runtime 106 may represent one or more runtime libraries. A runtime library is a collection of utility functions which support a program while it is running, working with the operating system to provide facilities such as mathematical functions, input and output. The runtime library makes it unnecessary for programmers to continually rewrite basic capabilities specified in a programming language or provided by an operating system. In one embodiment, for example, the client runtime 106 may include a C runtime library. For example, the CRT may comprise a runtime library of routines which contain C specific code the compiler uses at runtime. For example, the CRT might help with language feature implementations, like initializing the operating system, handling uncaught exceptions or implementing floating point code. In one embodiment, for example, the client runtime 106 may implement a CRT specifically designed for a host context framework (HCF) 120, as described further below.

In various embodiments, the client 102-1 may include a data access layer (DAL) 108. The DAL 108 may represent an abstraction layer comprising a collection of public interfaces (e.g., APIs) to allow LOB clients to produce and consume office business entity (OBE) data maintained by the LOB application system 150. The LOB application system 150 may comprise various LOB application programs collectively referred to as EWS 142. The OBE data may include fragmented business entity data, heterogeneous interfaces and data formats, disconnected applications, and otherwise data of questionable quality. The DAL 108 provides an abstraction layer over the definition of unknown LOB operations modeled as business entities.

In various embodiments, the DAL 108 will provide several advantages to LOB data consumers and developers. For example, the DAL 108 may provide discovery of available cached entities maintained by the CDS 110. The DAL 108 may provide details about each entity with respect to entity properties, entity operations, and Uniform Resource Identifiers (URIs). The DAL 108 may also allow custom proxy generation for a office business application (OBA) developer thereby making it easier to access the entity model definitions and associated operations. During runtime, the DAL 108 may provide several advantages, such as assisting in resolving the execution of operations given a unified method invocation, allowing the invocation of stereotyped operations that are mapped to real and unknown services in the back end LOB application system 150, providing transparent support for caching while remaining agnostic regarding a data source for the information, providing caching and queuing capabilities, providing query capabilities of the cached entities and conflict resolution mechanisms, providing notification about data being updated on backend systems, and performing forced refresh of an entity on the cache.

In various embodiments, the operation manager component 116 may be used to execute operations stored during an offline mode when network connectivity is established in an online mode. The operation manager component 116 may include a synchronization agent component 112 and an invoker component 114. The synchronization agent component 112 is the process responsible for flushing an operational queue for storing operations and executing the stored operations against the LOB system. The synchronization agent component 112 may also refresh a client data store (CDS) 110 in addition to executing the queued operations. The synchronization agent component 112 may execute the stored operations against the LOB system using the invoker component 114.

In various embodiments, the client 102-1 may include the CDS 110. The CDS 110 may comprise a data store for client side cached data. In one embodiment, for example, the CDS 110 may store client side cached LOB data that mirrors the LOB data stored by the middle-tier LOB server 130 and/or the LOB application system 150. The CDS 110 may also store an operational queue to store operations executed by the client 102-1 in an offline mode, and a state for each operation or set of operations. Further, the CDS 110 may store various tables for a given data schema, such as a mapping table for correlation IDs and entity IDs that may be useful when performing offline operations and synchronizing online operations. The CDS 110 may maintain this information as part of a Structured Query Language (SQL) database. SQL is a computer language used to create, modify, retrieve and manipulate data from relational database management systems. In one embodiment, for example, the CDS 110 may be implemented as an SQL Express database.

In general operation, the client 102-1 may execute an application program **104-1-*m*. During runtime, the client runtime 106 may instantiate various components of the HCF 120. The HCF 120 may comprise various methods, classes, types, properties, interfaces, program interfaces, APIs, data schemas, and other techniques for creating and managing a host context for a host item object. A host item object may comprise any object for an application program or a specific item for an application program. Examples of application programs suitable for item objects include the examples given with the application programs 104-1-*n*, and others as well. Examples of items for an application program, such as a MICROSOFT OUTLOOK application program, may include a contact item, a calendar item, an appointment item, a note item, an email item, a journal item, an LOB item, and so forth. The type of application programs and application program items suitable for use with the HCF 120** are many, and the embodiments are not limited in this context.

In one embodiment, for example, the HCF 120 may include an instantiation of a host context manager. The host context manager may receive context-related events, read the corresponding behavior instructions from a catalog manager, and translate those instructions into object manager calls towards other object managers in the client runtime 106. In this manner, the host context manager abstracts some of the operations for a given host item object to facilitate programming and use of the host item object.

To accomplish this, the host context manager may create and manage a family of objects associated with a given host item object for an application program **104-1-*n* or application program item for an application program 104-1-*n***. The family of objects associated with a given host item object, and their relationships, may be collectively referred to herein as a "host context." A typical example of creating or using a host context would include receiving an open item event for a MICROSOFT OUTLOOK appointment item, reading from the catalog manager that a particular office business part (OBP) should be shown for a new appointment item, and calling the user interface content manager to show the defined OBP.

In various embodiments, the HCF 120 may provide several advantageous features for generating and managing a host context. For example, the HCF 120 may provide the capability to associate solution defined user interface elements with a host item object. The HCF 120 may provide the capability to associate solution defined code-behind with a host item object. The HCF 120 may provide the capability to associate solution defined data sources (e.g., DAL proxies) with a host item object. The HCF 120 may provide the capability to correlate the lifetime of such groups of objects with the lifetime of the host item object. The HCF 120 may provide the capability to associate any of the items described above, such as user interface elements, code behind and data sources, in various combinations. The HCF 120 may provide the capability to associate custom behavior to an event originally raised by the host application and relayed, in a host agnostic manner, by a host integration manager. The HCF 120 may provide the capability to describe these relationships and event behaviors via data as opposed to custom code. The HCF 120 may provide the capability to embed data in a host item object via the host context. These and other features of the HCF 120 may be described in more detail with reference to FIG. 2.

Figure 2:
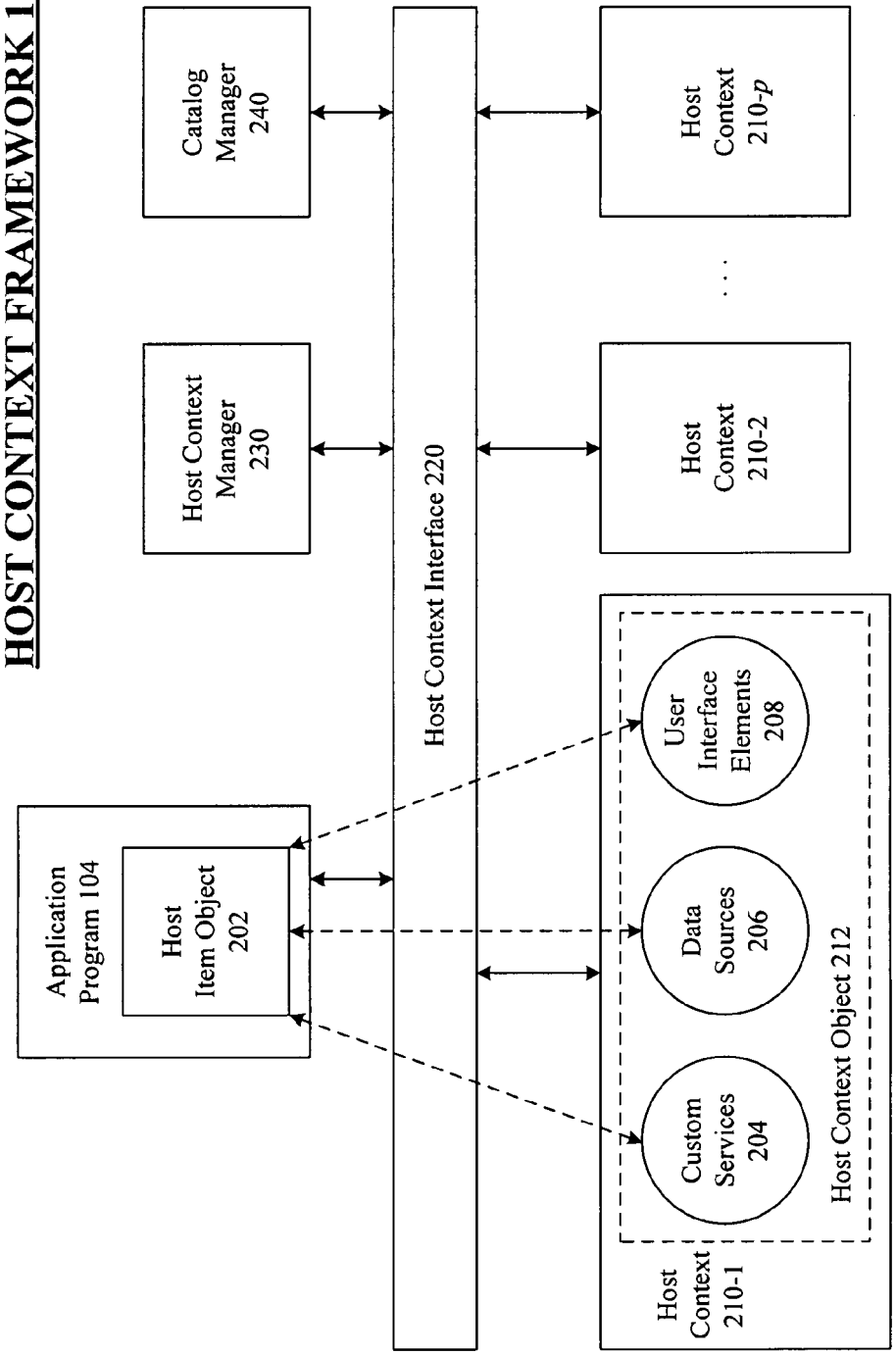
FIG. 2 illustrates one embodiment of a host context framework.

FIG. 2 illustrates a more detailed view of the HCF 120. FIG. 2 provides a logical view of the various public interfaces (API), calls and objects included with the HCF 120. In one embodiment, for example, the HCF 120 may include various public APIs, including a representative public interface named IHostContextManager. The IHostContextManager may include a syntax as follows:

IHostContext GetHostContext(string solutionId, string hostApplicationName, string contextType, string nativeItem Type, object nativeItem, bool create)

As previously described, a host context manager 230 may associate custom services 204, data sources 206 and user interface elements 208 to a host item object 202 to form a host context 210-1 of the host contexts **210-1-*p*. As shown in FIG. 2, the host context manager 230 may create the host context 210-1 for the host item object 202** which is an item level item object for the application program 104-1-n. The host item object 202, however, may also represent an application level item object for one of the application programs 104-1-n, such as MICROSOFT OUTLOOK, for example.

The associated objects for the host context 210-1 are encapsulated in a host context object 212 which implements a host context interface 220. Due to the need to associate the lifetime of the host context object 212 with that of the host item object 202, the host context manager 230 is typically the only component allowed to create and destroy host contexts 210-1-p.

In one embodiment, only one host context 210-1-p may exist for any given combination of a solution identifier (ID), context type, native item type and native item object. To ensure this condition is satisfied, all host contexts 210-1-p are stored in an internal dictionary, indexed by the four keys mentioned above. This method will be implemented by first checking the dictionary to determine whether such a context already exists. If so, it is returned to the client. If not, a new host context is created, added to the dictionary and then returned to the client. It is worthy to note that the host context manager 130 is not responsible for creating the hierarchy of contexts established via the ParentContext property of a host context 210-1-p. Rather, it is up to the internal clients of the host contexts 210-1-p to set it up. Notable error conditions for this API includes a fatal error where there is no suitable context template found based on a given solutionId, hostApplicationName, contextType and nativeItemType. In addition to the public interface named IHostContextManager, there may be other public interfaces suitable for the HCF 120 as appropriate for a given implementation.

In response to a context-related event, the host context manager 230 will read the appropriate behavior information from a catalog maintained by the catalog manager 240. The catalog may include behavior information describing and controlling the behavior and actions for a host object item 202 associated with a given host context 210-1-p. Examples of behavior information maintained in a catalog by the catalog manager 240 includes but is not limited to available custom services, data sources, user interface elements, data schemas, methods, actions, parameters, types, properties, classes, interfaces, program languages, instantiations and any other information used to control the behavior for a host item object. Once the host context manager 230 reads the appropriate behavior from the catalog maintained by the catalog manager 240, the host context manager 230 makes the appropriate HCF 120 framework calls to perform the defined behavior.

The HCF 120 will be able to detect certain events in the host application programs 104-1-m and treat them according to the specifications of a given solution developer. To that end, the host context manager 230 will listen to the events, read the appropriate behavior from the catalog manager 240, and make the appropriate HCF 120 framework calls to perform that behavior. TABLE 1 provides an example of various context-related events, how each event is exposed in terms of which component of the framework exposes the event, and a semantic meaning for each event.

TABLE 1

| EVENT | INTERNALLY RAISED BY | EXPOSED AS | SEMANTICS |
|---|---|---|---|
| FrameworkStarted | Client of Runtime (typically VSTO AddIn driving the Runtime) | Runtime.Events.Framework Started | The host application has been started and the framework is ready for interaction (can raise events and receive OM calls) |
| ItemListOpening | HostIntegrationManager | Runtime.HostIntegration Manager.ItemListOpening | A list of items has been accessed (e.g. Outlook folder open) |
| ExtendedItemOpening | HostIntegrationManager | Runtime.HostIntegration Manager.ExtendedItemOpening | An item that is recognized as a LOBi-extended item has been opened (e.g. Opportunity Inspector open) |
| StandardItemOpening | HostIntegrationManager | Runtime.HostIntegration Manager.StandardItemOpening | A standard (non-LOBi-extended) host item has been open (e.g. Outlook Note Inspector open) |
| ItemExtending | HostIntegrationManager | Runtime.HostIntegration Manager.ItemExtending | The user has requested that a standard item be extended to become a LOBi-extended item. |
| ItemRestricting | HostIntegrationManager | Runtime.HostIntegration Manager.ItemRestricting | The user has requested that an extended item be restricted back towards a standard item. |
| ItemPersisting | HostIntegrationManager | Runtime.HostIntegration Manager.ItemPersisting | The host item is being persisted, either as a result of user interaction or as a result of an OM call. |
| FrameworkShuttingDown | HostIntegrationManager | Runtime.Events.Framework ShuttingDown | The host application (and consequently the framework) is about to be shutdown. |

It may be appreciated that TABLE 1 merely provides some examples of context-related events and associated components and semantics. The HCF 120 may be suitable for use with many types of context-related events as desired for a given solution or solution developer, and the embodiments are not limited in this context.

In various embodiments, the HCF 120 may implement various event verbs. An event verb may comprise a term in a vocabulary that is available to the solution developer for specifying event behavior. Corresponding to each solution specific context definition there will be behaviors defined for various events occurring regardless of whether these events are exposed to the solution developer. The list of events for which the solution developer can specify behavior is made up of the host events described above and any specified cross-synchronization events. A cross-synchronization event may refer to those events that occur when attempting to synchronize data between multiple client databases, with each client database having a separate synchronization circuit with a respective server.

A solution developer can use various behavior primitives to create a behavior to associate with a given event, as desired for a given implementation. Some examples of behavior primitives suitable for use in creating a behavior associated with a given context-related event may be described as follows:

ShowUI—Takes as parameters a description of the layout of OBP to be shown and the location (e.g. TaskPane, SmallRegion, LargeRegion) of where to show the assembled layout. Results in the appropriate user interface are shown in the appropriate location. The instantiated OBP, if named, may be accessed via the context mechanisms.

ExecuteCRUDOperation—Takes as parameters a data source object name, the create, read, update or delete (CRUD) operation to perform to the backing store of that data source and a list of parameters to be passed to that CRUD operation. Any parameter in the list of parameters to the CRUD operation is either an object name defined in the given context or an object name and property name pair.

Bind—Takes as parameters two object names (any two named context objects can be specified here) and the alias of a binding template and applies the binding template to those two objects.

CallMethod—Takes as parameters one object name, a method name and a list of parameters and executes the method. The list of parameters follows the same specification as the one in "ExecuteCRUDOperation".

CallStaticMethod—Takes as parameters one alias, a method name and a list of parameters and executes the static method. The method should be defined at the level of the type returned as a result of resolving the alias. The list of parameters follows the same specification as the one in "ExecuteCRUDOperation".

CallOBPartMethod—Takes as parameters an office business page name, an OBP name, a method name and a list of parameters and executes the method, if the OBP was already instantiated Otherwise, it logs an error indicating that the OBP was not instantiated. The method should be present at the OBP instance level. The list of parameters follows the same specification as the one in "ExecuteCRUDOperation".

A HostContext class will encapsulate all the functionality required by the IHostContext interface. Specifically, it will have strong typed fields for the items exposed via the IHostContext interface. For the collections of objects (e.g., data sources, custom services, or user interface items) each HostContext object will also contain two dictionaries of NamedObjects. Within each dictionary, the items are indexed by their name. An example for the relevant contract of the NamedObject class is as follows:

string Name {get; set;}—The name of the object.

string Alias {get; set;}—The alias to be instantiated when needed This alias will be passed to the ObjectFactory to obtain an instance of the wrapped object.

bool LazyInstantiation {get; set;}—Gets whether the wrapped object should be instantiated immediately or only when needed. Setting this value once the wrapped object has been instantiated has no effect.

bool IsInstantiated {get;}—Determines whether the wrapped object has been instantiated or not.

object WrappedObject {get;}—Returns the wrapped object instance. If LazyInstantiation is set to true and this is the first time the WrappedObject is accessed, it will also ask the ObjectFactory to create an instance of this alias.

Figure 3:
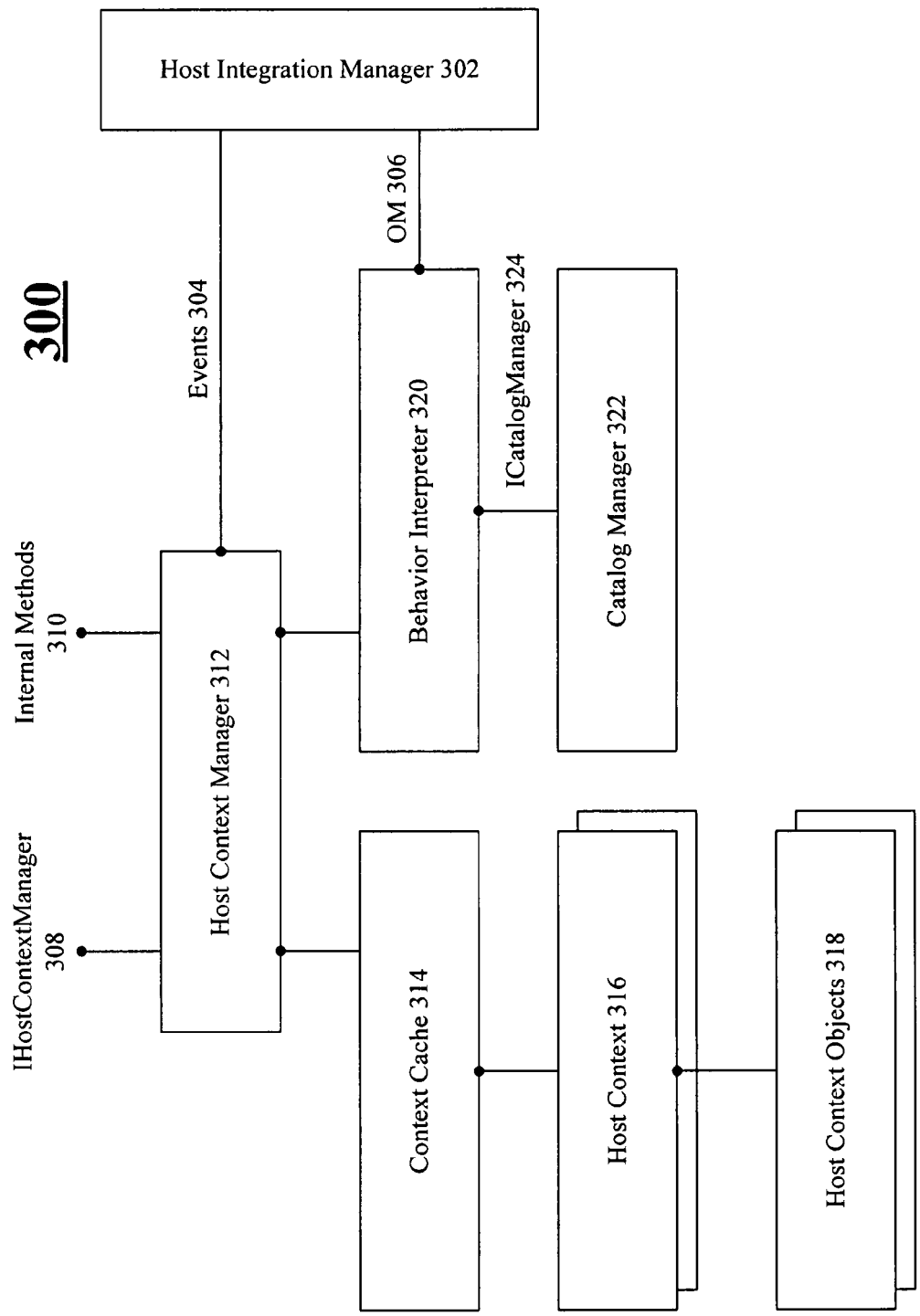
FIG. 3 illustrates one embodiment of a host context component diagram.

FIG. 3 illustrates one embodiment of a host context component diagram 300. The component diagram 300 shows the relationships between the various components of an exemplary host context framework, such as the HCF 120, for example. The component diagram 300 illustrates a host integration manager 302. The host integration manager 302 may expose an interface for events 304 and object manager (OM) 306. A host context manager 312 may expose interfaces via an iHostContextManager interface 308 and internal methods 310. The component that creates host context objects 318 is a context cache 314. The context cache 314 exposes enough functionality to be able to implement the iHostContextManager interface 308. Internally, the context cache factor 314 maintains a dictionary of instantiated host contexts, indexed by their corresponding Solution ID, Type, Native Item Type and Native Item object.

The main consumer of host context objects 318 is a behavior interpreter 320 of the host context manager 312. The host context manager 312 will detect events 304 coming from the rest of the host context framework, and will request the corresponding host context 316 from the context cache 314. The context cache 314 will first check the internal dictionary using the previously described index keys to determine whether such the host context 316 already exists. If so, the context cache 314 will return the host context 316 to the client. If not, the context cache 314 will create a new host context 316, add it to the internal dictionary, and then return the new host context to the client.

The host context manager 312 will then pass the host context object 318 and event information to the behavior interpreter 320. The behavior interpreter 320 will check the catalog definition of the event behavior via the iCatalogManager interface 324 from a catalog maintained by the catalog manager 322. The behavior interpreter 320 will operate in accordance with the received catalog definition.

Operations for the host context framework may be further described with reference to a sample event sequence. Assume a user initiates MICROSOFT OUTLOOK and desires to open an item. When the user opens MICROSOFT OUTLOOK it instantiates a framework MICROSOFT VISUAL STUDIO TOOLS FOR OFFICE (VSTO) AddIn, which in turn instantiates the client runtime 106. The client runtime 106 requests an application level host context 316-1 with a native item type set to "OUTLOOK" from the host context manager 312. The client runtime 106 then raises a FrameworkStarted event with the newly created host context 316-1. In the application started event behavior, the solution can register services to be loaded, data proxies to be loaded, and so forth. Due to MICROSOFT OUTLOOK being opened, a folder is opened.

Once MICROSOFT OUTLOOK is opened, assume the user double clicks an appointment item. A host integration manager 302 detects an InspectorOpen event. It asks the host context manager 312 for an item level host context 316-2 with native item type set to "Appointment" and the native item comprising the appointment item being opened. The host context manager 312 creates the host context 316-2 and returns it. The host integration manager 302 then fills the host context 316-2 with all the information it currently has available. For example, the host integration manager 302 fills the host context 316-2 with the parent context which is the host context 316-1 corresponding to the item list (e.g., the folder). The host integration manager 302 can obtain the host context 316-1 by requesting it again from the host context manager 312, which will return it if available. The host integration manager 302 may also fill the host context 316-2 with the native user interface item, also referred to as the inspector object. Finally, the host integration manager 302 fills the host context 316-2 with the HostItemBindableWrapper object created by the HostItemProxyFactory, which exposes the native item in a bindable way. The host integration manager 302 then raises the ItemOpen event with the built context as the argument. The host context manager 312 receives the ItemOpen event and treats it as a context activation, thus performing the appropriate behavior in terms of services, data sources and OBPs, as specified in the catalog manager 322.

Assume the user saves the newly created appointment item and closes the inspector. The host integration manager 302 detects an ItemSave event. The host integration manager 302 asks the host context manager 312 for an item level host context 316-2 with native item type set to "Appointment" and the native item being the appointment item being saved. The host context manager 112, via the context cache 314, detects that the host context 316-2 has been created before and is still in use, obtains it and returns it. The host integration manager 302 then raises the ItemOpen event with the built context as the argument. The host context manager 312 receives the ItemOpen event and treats it as a context activation, thus performing the appropriate behavior in terms of services, data sources and OBPs, as specified in the catalog maintained by the catalog manager 322. The host integration manager 302 detects that the item is about to be closed. It asks the host context manager 312 for an item level host context 316-2 with native item type set to "Appointment" and the native item comprising the appointment item being opened. The host context manager 316-2, via the context cache 314, detects that the host context 316-2 has been created before and is still in use, obtains it and returns it. The host integration manager 302 then requests that the host context 316-2 be removed from the list of cached host contexts maintained by the host context manager 312 because the corresponding context has been deactivated. At this point all the services, data sources and OBPs corresponding to that context would be released.

When the user closes MICROSOFT OUTLOOK, the host integration manager 302 detects an ApplicationClose event. The host integration manager 302 asks the host context manager 312 for an application level host context 316-1 with native item type set to "OUTLOOK" and the native item being the application object itself. The host context manager 312 detects that the host context 316-1 has been created before and is still in use, obtains it and returns it. The host integration manager 302 first raises a application shut down event with the host context 316-1. The host integration manager 302 then requests that the host context 316-1 be removed from the list of cached host contexts maintained by the host context manager 312 because the corresponding context has been deactivated. At this point all the services, data sources and OBPs corresponding to that context would be released. The client runtime 106 should then be ready for shutdown.

Operations for the enterprise system 100 may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more elements of the enterprise system 100 or alternative elements as desired for a given set of design and performance constraints.

Figure 4:
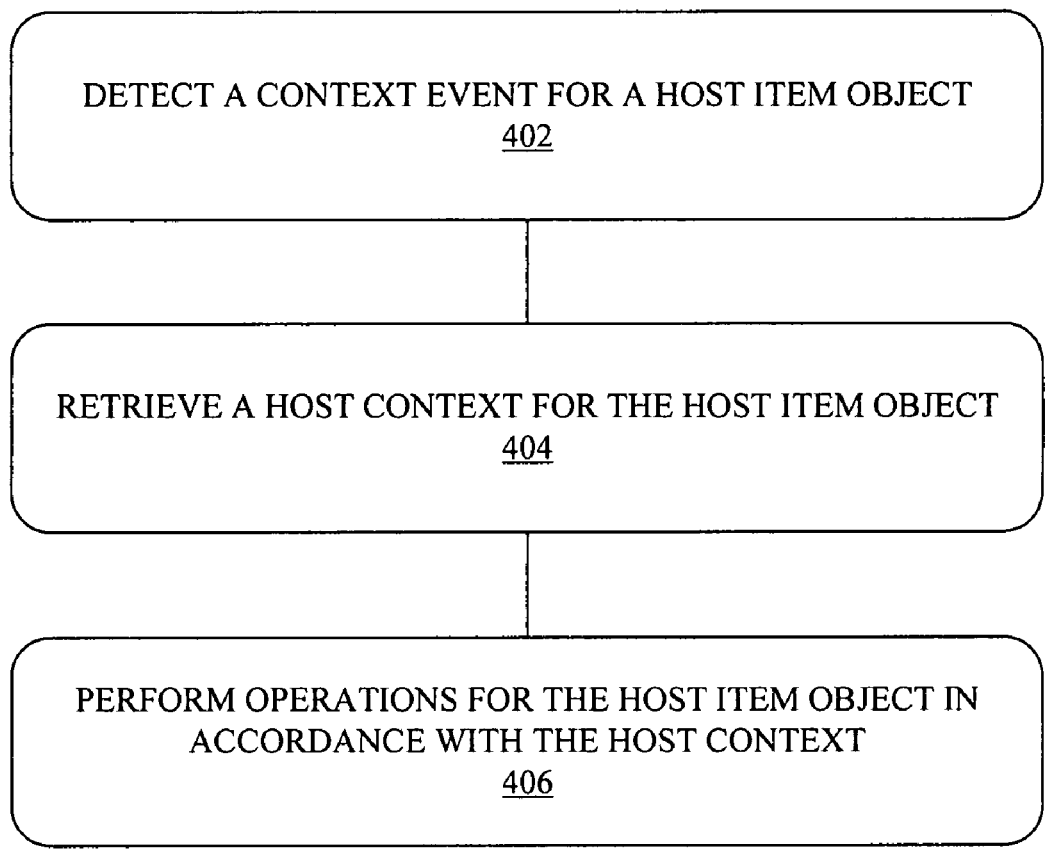
FIG. 4 illustrates one embodiment of a logic flow.

FIG. 4 illustrates a logic flow 400. The logic flow 400 may be representative of the operations executed by one or more embodiments described herein. As shown in FIG. 4, the logic flow 400 may detect a context event (304) for a host item object (202) at block 402. A host context (210, 316) may be retrieved for the host item object (202) at block 404. Operations for the host item object may be performed in accordance with the host context (210, 316) at block 406.

In one embodiment, for example, the host context may be created by associating multiple objects with the host item object. For example, the host context may be created by associating one or more custom services (204), data sources (206), and user interface elements (208) with the host item object to form the host context.

In one embodiment, for example, the operations for the host item object may be performed by reading behavior information for the host item object from the host context. For example, the behavior information may be read from a catalog (240, 322) having defined behavior operations and behavior definitions for the host item object. The defined behavior operations may represent a set of operations performed for the host item object for the host context. The behavior definitions may represent a custom service, a data source, and a user interface element for the host item object for the host context. The operations for the host item object may be performed in accordance with the behavior information. For example, the behavior information may be translated into object manager calls (306) for multiple object managers internal and external to the host context framework.

In various embodiments, a solution developer may develop a given solution using the HCF 120. A HCF development tool may help the solution developer generate the behavior description. The HCF development tool may be used to define a solution by first developing .NET based OBP, custom services and data source proxies according to the HCF contracts. The HCF development tool may be used to reference certain items with the host context parts. The HCF development tool may be used to identify the relevant context(s), such as Application/Outlook, Item/Contact, ExtendedItem/Lead, and so forth. For each relevant context, the HCF development tool may be used to determine the custom services available for the lifetime of an instance of such a context, the data proxies similarly available and the layout of user interface fragments. The HCF development tool may be used to specify the information in a way in which the HCF 120 can understand and persist for later deployment on the client 102-1-m. Within a given context, the HCF development tool may be used to determine the events which are relevant, such as "ItemOpen" and "ItemPersist." For each such event associated with a host context, the HCF development tool may be used to specify the associated behavior, in terms of well understood verbs (e.g., event verbs such as ShowUI, CallMethod, and so forth) and the identified objects. Finally, the HCF development tool may be used to compile the solution and present it for deployment on the client 102-1-m.

In various embodiments, the HCF 120 may provide the capability to embed data in a host item object via the host context. Since a host context may comprise an abstraction over one or more host item objects, one aspect of the HCF 120 may be embedding data from various data sources in a host item object as indicated by the host context. An example may be given by the following pseudocode:

```
<ContextDefinition>
    <Objects>
        <DataSources>
            <DataSource ObjectAlias="CustomerSourceAlias"
                Name="customerProxyInstance"/>
        </DataSources>
    </Objects>
</ContextDefinition>
```

This example would instruct the client runtime to embed the data of the customer entity as described by the CustomerSourceAlias in the context defined here, and later refer to that data by the name of customerProxyInstance. It may be appreciated that other context definition details may be included, such as which part of the host application to which this context refers, for example.

Figure 5:
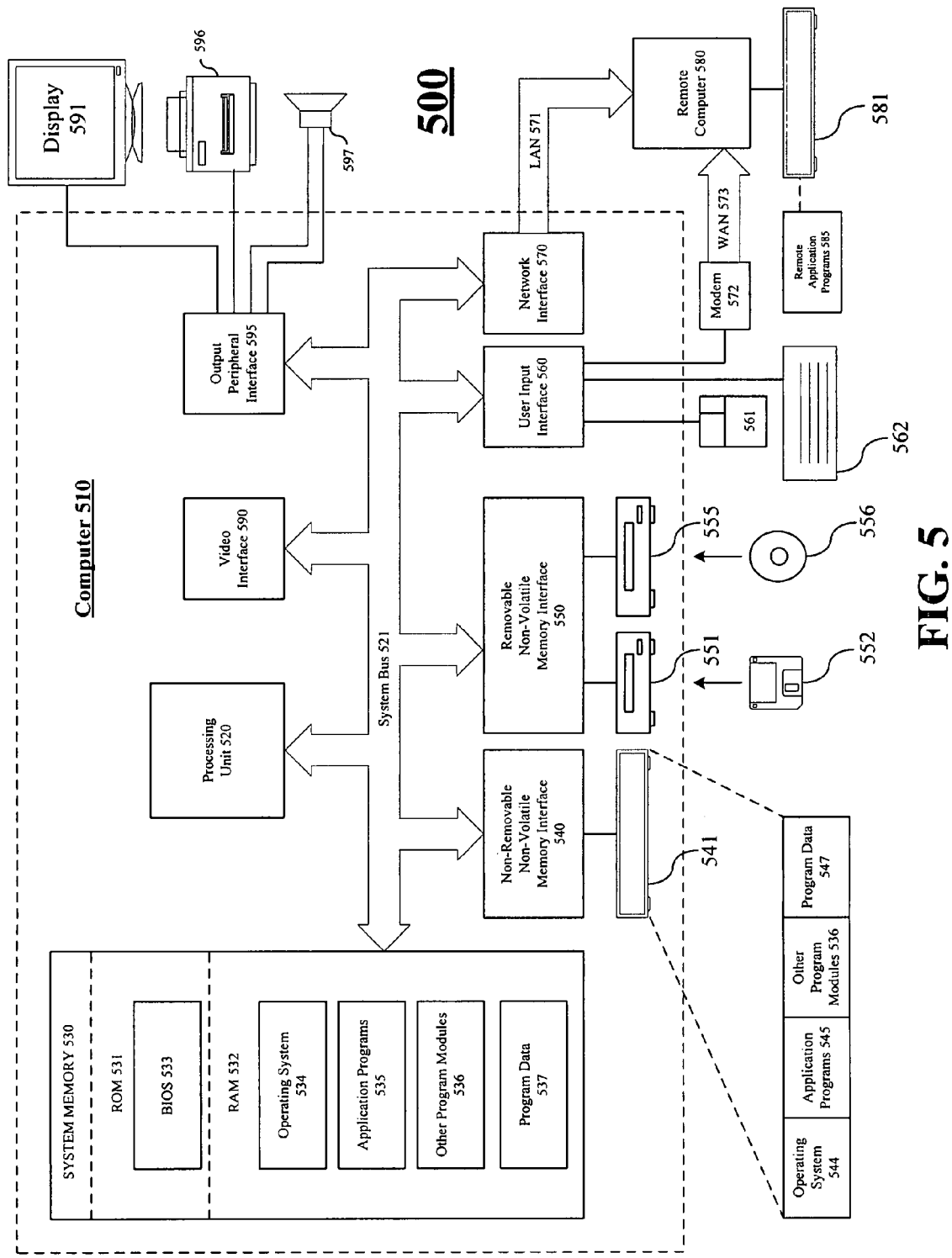
FIG. 5 illustrates one embodiment of a computing system architecture.

FIG. 5 illustrates a block diagram of a computing system architecture 500 suitable for implementing various embodiments, including the various elements of the enterprise system 100. It may be appreciated that the computing system architecture 500 is only one example of a suitable computing environment and is not intended to suggest any limitation as to the scope of use or functionality of the embodiments. Neither should the computing system architecture 500 be interpreted as having any dependency or requirement relating to any one or combination of components illustrated in the exemplary computing system architecture 500.

Various embodiments may be described in the general context of computer-executable instructions, such as program modules, being executed by a computer. Generally, program modules include any software element arranged to perform particular operations or implement particular abstract data types. Some embodiments may also be practiced in distributed computing environments where operations are performed by one or more remote processing devices that are linked through a communications network. In a distributed computing environment, program modules may be located in both local and remote computer storage media including memory storage devices.

As shown in FIG. 5, the computing system architecture 500 includes a general purpose computing device such as a computer 510. The computer 510 may include various components typically found in a computer or processing system. Some illustrative components of computer 510 may include, but are not limited to, a processing unit 520 and a memory unit 530.

In one embodiment, for example, the computer 510 may include one or more processing units 520. A processing unit 520 may comprise any hardware element or software element arranged to process information or data. Some examples of the processing unit 520 may include, without limitation, a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, the processing unit 520 may be implemented as a general purpose processor. Alternatively, the processing unit 520 may be implemented as a dedicated processor, such as a controller, microcontroller, embedded processor, a digital signal processor (DSP), a network processor, a media processor, an input/output (I/O) processor, a media access control (MAC) processor, a radio baseband processor, a field programmable gate array (FPGA), a programmable logic device (PLD), an application specific integrated circuit (ASIC), and so forth. The embodiments are not limited in this context.

In one embodiment, for example, the computer 510 may include one or more memory units 530 coupled to the processing unit 520. A memory unit 530 may be any hardware element arranged to store information or data. Some examples of memory units may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), EEPROM, Compact Disk ROM (CD-ROM), Compact Disk Recordable (CD-R), Compact Disk Rewriteable (CD-RW), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk (e.g., floppy disk, hard drive, optical disk, magnetic disk, magneto-optical disk), or card (e.g., magnetic card, optical card), tape, cassette, or any other medium which can be used to store the desired information and which can accessed by computer 510. The embodiments are not limited in this context.

In one embodiment, for example, the computer 510 may include a system bus 521 that couples various system components including the memory unit 530 to the processing unit 520. A system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, and so forth. The embodiments are not limited in this context.

In various embodiments, the computer 510 may include various types of storage media. Storage media may represent any storage media capable of storing data or information, such as volatile or non-volatile memory, removable or non-removable memory, erasable or non-erasable memory, writeable or re-writeable memory, and so forth. Storage media may include two general types, including computer readable media or communication media. Computer readable media may include storage media adapted for reading and writing to a computing system, such as the computing system architecture 500. Examples of computer readable media for computing system architecture 500 may include, but are not limited to, volatile and/or nonvolatile memory such as ROM 531 and RAM 532. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio-frequency (RF) spectrum, infrared and other wireless media. Combinations of the any of the above should also be included within the scope of computer readable media.

In various embodiments, the memory unit 530 includes computer storage media in the form of volatile and/or non-volatile memory such as ROM 531 and RAM 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536, and program data 537.

The computer 510 may also include other removable/non-removable, volatile/nonvolatile computer storage media. By way of example only, FIG. 5 illustrates a hard disk drive 540 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media discussed above and illustrated in FIG. 5, provide storage of computer readable instructions, data structures, program modules and other data for the computer 510. In FIG. 5, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies. A user may enter commands and information into the computer 510 through input devices such as a keyboard 562 and pointing device 561, commonly referred to as a mouse, trackball or touch pad. Other input devices (not shown) may include a microphone, joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. In addition to the monitor 591, computers may also include other peripheral output devices such as speakers 597 and printer 596, which may be connected through an output peripheral interface 590.

The computer 510 may operate in a networked environment using logical connections to one or more remote computers, such as a remote computer 580. The remote computer 580 may be a personal computer (PC), a server, a router, a network PC, a peer device or other common network node, and typically includes many or all of the elements described above relative to the computer 510, although only a memory storage device 581 has been illustrated in FIG. 5 for clarity. The logical connections depicted in FIG. 5 include a local area network (LAN) 571 and a wide area network (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other technique suitable for establishing communications over the WAN 573, such as the Internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example, and not limitation, FIG. 5 illustrates remote application programs 585 as residing on memory device 581. It will be appreciated that the network connections shown are exemplary and other techniques for establishing a communications link between the computers may be used. Further, the network connections may be implemented as wired or wireless connections. In the latter case, the computing system architecture 500 may be modified with various elements suitable for wireless communications, such as one or more antennas, transmitters, receivers, transceivers, radios, amplifiers, filters, communications interfaces, and other wireless elements. A wireless communication system communicates information or data over a wireless communication medium, such as one or more portions or bands of RF spectrum, for example. The embodiments are not limited in this context.

Some or all of the enterprise system 100 and/or computing system architecture 500 may be implemented as a part, component or sub-system of an electronic device. Examples of electronic devices may include, without limitation, a processing system, computer, server, work station, appliance, terminal, personal computer, laptop, ultra-laptop, handheld computer, minicomputer, mainframe computer, distributed computing system, multiprocessor systems, processor-based systems, consumer electronics, programmable consumer electronics, personal digital assistant, television, digital television, set top box, telephone, mobile telephone, cellular telephone, handset, wireless access point, base station, subscriber station, mobile subscriber center, radio network controller, router, hub, gateway, bridge, switch, machine, or combination thereof. The embodiments are not limited in this context.

In some cases, various embodiments may be implemented as an article of manufacture. The article of manufacture may include a storage medium arranged to store logic and/or data for performing various operations of one or more embodiments. Examples of storage media may include, without limitation, those examples as previously provided for the memory unit 530. In various embodiments, for example, the article of manufacture may comprise a magnetic disk, optical disk, flash memory or firmware containing computer program instructions suitable for execution by a general purpose processor or application specific processor. The embodiments, however, are not limited in this context.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. It is worthy to note that although some embodiments may describe structures, events, logic or operations using the terms "first," "second," "third," and so forth, such terms are used merely as labels, and are not intended to impose numerical requirements on their objects. Further, such terms are used to differentiate elements and not necessarily limit the structure, events, logic or operations for the elements.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method, comprising:
   detecting a context event for a host item object;
   retrieving a host context for said host item object, wherein said host context comprises at least one object associated with said host item object;
   reading behavior information for said host item object from a catalog associated with said context event and said host context, said reading of behavior information responsive to said detection of said context event, said behavior information comprising behavior operations representing a set of operations performed for said host item object for said host context and behavior definitions for said host item object, said behavior definitions representing a custom service, a data source, and a user interface element for said host item object for said host context;
   translating said behavior information into object manager calls for multiple object managers; and
   performing operations for said host item object in accordance with said behavior information using said object manager calls.

2. The computer-implemented method of claim 1, comprising creating said host context by associating multiple objects with said host item object.

3. The computer-implemented method of claim 1, comprising associating a custom service, a data source, or a user interface element with said host item object to form said host context.

4. An article comprising a storage medium containing instructions that if executed by a processor enable a system to:
   detect a context event for a host item object;
   retrieve a host context for said host item object, wherein said host context comprises at least one object associated with said host item object;
   read behavior information for said host item object from a catalog associated with said context event and said host context, said reading of behavior information responsive to said detection of said context event, said behavior information comprising behavior operations representing a set of operations performed for said host item object for said host context and behavior definitions for said host item object, said behavior definitions representing a custom service, a data source, and a user interface element for said host item object for said host context;
   translating said behavior information into object manager calls for multiple object managers; and
   perform operations for said host item object in accordance with said behavior information using said object manager calls.

5. The article of claim 4, further comprising instructions that if executed enable the system to create said host context by associating multiple objects with said host item object.

6. The article of claim 4, further comprising instructions that if executed enable the system to associate a custom service, a data source, or a user interface element with said host item object to form said host context.

7. The article of claim 4, further comprising instructions that if executed enable the system to embed data in said host item object in accordance with said host context.

8. An apparatus, comprising:
   a client device having a processor operative to execute a host application program with multiple host item objects and a host context manager to manage multiple host contexts corresponding to said host item objects, each of said host contexts corresponding to a host item object and comprising at least one object associated with said host item object, said host context manager to create a host context for each host item object, and perform operations for each host item object in accordance with said corresponding host context;
   said processor further operative to execute a catalog manager having a catalog of behavior information for each host context, said catalog manager to read behavior information for a host item object from said catalog, said reading of behavior information responsive to a detection of a context event, said behavior information comprising behavior operations representing a set of operations performed for said host item object for said host context and behavior definitions for said host item object, said behavior definitions representing a custom service, a data source, and a user interface element for said host item object for said host context;
   a behavior interpreter to translate behavior information into object manager calls for multiple object managers; and
   said host context manager to perform operations for a host item object in accordance with said corresponding behavior information using said object manager calls.

9. The apparatus of claim 8, comprising a context cache to create a host context by associating a custom service, a data source, or a user interface element with a host item object to form said host context.

10. The apparatus of claim 8, comprising a host integration manager to detect an event for a host item object, request a host context corresponding to said host item object from said host context manager, and activate said host context.

* * * * *